(12) United States Patent
Ljung Edin et al.

(10) Patent No.: US 12,728,914 B2
(45) Date of Patent: Sep. 8, 2026

(54) METHOD OF CONTROLLING A STEERING OPERATION AND A STEERING SYSTEM

(71) Applicant: VOLVO TRUCK CORPORATION, Gothenburg (SE)

(72) Inventors: Alexander Ljung Edin, Gothenburg (SE); Rebecka Villiamsson, Västra Frölunda (SE); Jan-Inge Svensson, Gothenburg (SE); Sebastian Palm, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 423 days.

(21) Appl. No.: 18/572,249

(22) PCT Filed: Jun. 28, 2021

(86) PCT No.: PCT/EP2021/067669

§ 371 (c)(1),
(2) Date: Dec. 20, 2023

(87) PCT Pub. No.: WO2023/274493

PCT Pub. Date: Jan. 5, 2023

(65) Prior Publication Data

US 2024/0286672 A1 Aug. 29, 2024

(51) Int. Cl.
*B62D 5/04* (2006.01)

(52) U.S. Cl.
CPC ......... *B62D 5/0484* (2013.01); *B62D 5/0463* (2013.01)

(58) Field of Classification Search
CPC ...... B62D 5/0484; B62D 5/0463; B62D 7/08; B62D 15/025; B62D 5/04; B62D 5/0418
See application file for complete search history.

(56) References Cited

U.S. PATENT DOCUMENTS 11,235,747 B2 * 2/2022 Källstrand ...... B60W 30/18145
2007/0185638 A1 * 8/2007 Odenthal ............... B60W 40/11
701/70

(Continued)

FOREIGN PATENT DOCUMENTS

CN 119872681 A * 4/2025 ........... B62D 5/0484
CN 120270326 A * 7/2025 ............... B62D 6/00

(Continued)

OTHER PUBLICATIONS

International Search Report and Written Opinion of the International Searching Authority in International Application No. PCT/EP2021/067669 mailed Mar. 10, 2022 (12 pages).

*Primary Examiner* — Drew J Brown
(74) *Attorney, Agent, or Firm* — Jeffri A. Kaminski; Venable LLP

(57) ABSTRACT

A method of controlling a steering operation of a vehicle comprising a first steerable wheel and a second steerable wheel mechanically connected to each other. Is provided. The method includes determining a steering angle for operating the vehicle during a turning maneuver, determining, during the turning maneuver, a first current steering angle indicative of a current steering angle of the first steerable wheel, and a second current steering angle indicative of a current steering angle of the second steerable wheel, determining an offset steering angle, the offset steering angle being a difference between the first current steering angle and the second current steering angle, applying a first steering torque on the first steerable wheel, the first steering torque being based on a difference between the requested steering angle and the first current steering angle, and applying a second steering torque on the second steerable wheel, the second steering torque being based on the offset (Continued)

steering angle and a difference between the requested steering angle and the second current steering angle.

15 Claims, 3 Drawing Sheets

(56) References Cited

U.S. PATENT DOCUMENTS

| | | | | |
|---|---|---|---|---|
| 2009/0093931 | A1* | 4/2009 | Mizutani | B60K 7/0007 701/41 |
| 2012/0006603 | A1* | 1/2012 | Thomson | B62D 11/24 180/6.48 |
| 2013/0325283 | A1* | 12/2013 | Rylander | B60W 40/114 701/82 |
| 2020/0089243 | A1* | 3/2020 | Poeppel | B60W 60/00 |
| 2020/0307685 | A1* | 10/2020 | Akiyama | G05D 1/0246 |
| 2021/0053615 | A1 | 2/2021 | Kondo et al. | |
| 2026/0021800 | A1* | 1/2026 | Codonesu | B60W 10/20 |

FOREIGN PATENT DOCUMENTS

| | | | | |
|---|---|---|---|---|
| EP | 3511227 | A1 * | 7/2019 | B62D 5/0463 |
| EP | 3694766 | A1 | 8/2020 | |
| EP | 3792149 | A1 | 3/2021 | |
| EP | 3838718 | A1 | 6/2021 | |
| EP | 3726726 | B1 * | 9/2025 | H02P 29/028 |
| WO | 2014128818 | A1 | 8/2014 | |
| WO | 2019072379 | A1 | 4/2019 | |

* cited by examiner

METHOD OF CONTROLLING A STEERING OPERATION AND A STEERING SYSTEM

CROSS-REFERENCE TO RELATED APPLICATIONS

This application is a U.S. National Stage application of PCT/EP2021/067669, Jun. 28, 2021 and published on Jan. 5, 2023 as WO 2023/274493, all of which is hereby incorporated by reference in its entirety.

TECHNICAL FIELD

The present invention relates to a method of controlling a steering operation of a vehicle. The present invention also relates to a steering system. Although the invention will mainly be directed to a vehicle in the form of a truck, the invention may also be applicable for other types of vehicles, such as working machines, buses, etc.

BACKGROUND

The technology of autonomous vehicle is on a steady development and autonomous vehicles are being applied in a wide variety of applications. By means of autonomous vehicles, a physical operator of the vehicle can be superfluous which provides for a number of advantages, such as e.g. increasing the operational capacity of the vehicles, reduction of cost, and increased safety. In the latter case, the autonomous vehicles can be operated at e.g. hazardous work sites and thereby avoiding potential accidents for an operator otherwise operating the vehicle.

One important aspect for autonomous vehicles is that the steering system operates as desired and in a more or less fail safe manner for the vehicle to function properly. The steering system of autonomous vehicles are conventionally controlled by using a redundant steering actuator at one of the steerable wheels.

However, a problem using a redundant steering actuator at one wheel is that independency of the redundant parts is difficult to achieve which can result in a steering operation not working as intended i.e. the vehicle will not fully follow the desired steering path.

There is thus a desire to improve the steering systems for autonomous vehicles.

SUMMARY

It is thus an object of the present invention to at least partially overcome the above described deficiencies.

According to a first aspect, there is provided a method of controlling a steering operation of a vehicle comprising a first steerable wheel and a second steerable wheel mechanically connected to each other, the method comprising determining a steering angle for operating the vehicle during a turning maneuver, determining, during the turning maneuver, a first current steering angle indicative of a current steering angle of the first steerable wheel, and a second current steering angle indicative of a current steering angle of the second steerable wheel, determining an offset steering angle, the offset steering angle being a difference between the first current steering angle and the second current steering angle, applying a first steering torque on the first steerable wheel, the first steering torque being based on a difference between the requested steering angle and the first current steering angle, and applying a second steering torque on the second steerable wheel, the second steering torque being based on the offset steering angle and a difference between the requested steering angle and the second current steering angle.

The steering angle determined for operating the vehicle during the turning maneuver may be determined instantaneously when the vehicle is operating and turns, or beforehand by e.g. a navigation system such as a GPS, etc. The method thereafter determines the actual and current steering angle, i.e. to determine if the vehicle is turning as desired. The current steering angle can be determined by, for example, receiving a signal from a respective steering actuator which is also arranged to apply the steering torque on the wheel. Alternatively, the current steering angle can be determined by a sensor measuring the actual steering angle for the respective steerable wheel. The steering angle on the left hand side and on the right hand side have different angles when operating the vehicle during a turning maneuver, since the inner wheel and the outer wheel follow different curve radii.

Further, it should be readily understood that the above described sequences of the method must not be executed in a specific consecutive order, the steps could be executed substantially simultaneous or in a revised order compared to the above described sequence.

The present invention is based on the insight that a mechanical offset and play will more or less always be present between the steering angle of the first and second steerable wheels for a steering system using dual steering actuators, i.e. a separate steering actuator for each steerable wheel. By controlling the second steering torque based also on the offset steering angle, the present invention advantageously reduces effects of this mechanical offset. An advantage is thus that the steerable wheels of the vehicle will follow the desired path during the turning maneuver to a better extent. Also, the risk of the steering actuators counteracting each other will be more or less eliminated. By providing a steering actuator at each of the steerable wheels presents the advantage that the steering actuators are less dependent on each other, i.e. an improved redundancy. Hence, in a situation where one side of the vehicle is exposed to e.g. a collision and the steering actuator at that position fails to function as desired, the other steering actuator at the opposite position can still function properly and control the steering operation. Another disadvantageous situation of using a steering actuator solely at one of the wheels is if the circuit board of the steering actuator is malfunctioning or being short-circuited.

According to an example embodiment, the method may further comprise determining, for a first steering actuator controlling a steering operation of the first steerable wheel, a required first steering torque for minimizing the difference between the requested steering angle and the first current steering angle, and controlling the first steering actuator to apply the required first steering torque on the first steerable wheel. In a similar vein and according to an example embodiment, the method may further comprise determining, for a second steering actuator controlling a steering operation of the second steerable wheel, a required second steering torque based on the offset steering angle and for minimizing the difference between the requested steering angle and the second current steering angle, and controlling the second steering actuator to apply the required second steering torque on the second steerable wheel. The first and second steering actuators are hereby individually controlled to reduce the difference between the requested steering angle and the respective current steering angles.

According to an example embodiment, the steering angle for operating the vehicle during a turning maneuver may be continuously updated during the turning maneuver. Thus, a continuous adaption is performed securing that the steering is properly handled throughout the turning maneuver.

According to an example embodiment, the second steering torque may be applied independently on the applied first steering torque.

According to an example embodiment, the method may further comprise storing, by a memory circuit of a control unit, the offset steering angle for each turning maneuver operated by the vehicle, determining that the first current steering angle is unable to be determined, and applying the second steering torque on the second steerable wheel based on an offset steering angle from a most preceding steering operation and a difference between the requested steering angle and the second current steering angle when the first current steering angle is unable to be determined.

The wording "storing" should be construed as the offset steering angle for a plurality of steering maneuvers are saved in the memory circuit. Hereby, when operating the vehicle at a situation corresponding to a turning maneuver that the vehicle has previously experienced, the second steering torque is controlled based on the previous situation. Hereby, the effects of the mechanical offset will still be reduced even when the first current steering angle is not detected, i.e. when there is, for example, a malfunction in the steering system. The memory circuit may form part of a database of the steering system.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the method may further comprise determining an individual offset steering angle value for a respective one of a plurality of determined steering angles, and storing, by a memory circuit of a control unit, each steering angles and their corresponding individual offset steering angle value. This is advantageous in situations where the steering system is unable to receive data of the first current steering angle. In such situation, the offset steering angle value for the currently determined steering angle can be used when applying the second steering torque.

According to a second aspect, there is provided a steering system for a vehicle, the steering system comprising first steering actuator connectable to a first steerable wheel of the vehicle, the first steering actuator comprising a first steering controller configured to receive a signal indicative of a requested steering angle and to control the first steering actuator to generate a steering operation for the first steerable wheel based on the requested steering angle, a first steering angle sensor configured to determine a first current steering angle indicative of a current steering angle of the first steerable wheel, wherein the first steering controller is configured to determine a difference between the requested steering angle and the first current steering angle, and to control the first steering actuator to apply a first steering torque on the first steerable based on the difference between the requested steering angle and the first current steering angle, and a second steering actuator connectable to a second steerable wheel of the vehicle, the second steerable wheel being mechanically connected to the first steerable wheel, the second steering actuator comprising a second steering controller configured to receive the signal indicative of the requested steering angle and to control the second steering actuator to generate a steering operation for the second steerable wheel based on the requested steering angle, a second steering angle sensor configured to determine a second current steering angle indicative of a current steering angle of the second steerable wheel, wherein the second steering controller is configured to determine a difference between the requested steering angle and the second current steering angle, wherein the first steering controller is further configured to transmit the first current steering angle to the second steering controller, wherein the second steering controller is configured to determine an offset steering angle, the offset steering angle being a difference between the first current steering angle and the second current steering angle, wherein the second steering controller is further configured to control the second steering actuator to apply a second steering torque on the second steerable wheel based on the offset steering angle and the difference between the requested steering angle and the second current steering angle.

According to an example embodiment, the steering system may further comprise a steering controller arranged to determine the requested steering angle, and to transmit the requested steering angle to the first steering controller and to the second steering controller. The steering controller is thus configured to determine the requested steering angle for the wheels of the vehicle, while the first and second steering controllers individually control the steering actuator, respectively. Preferably, and according to an example embodiment, the steering controller may be an autonomous steering controller.

According to an example embodiment, the steering controller may be connectable to a steering wheel, the steering controller being configured to determine the requested steering angle based on a rotation of the steering wheel.

According to an example embodiment, the first steering actuator may be a primary steering actuator, and the second steering actuator is a secondary steering actuator.

Further effects and features of the second aspect are largely analogous to those described above in relation to the first aspect.

According to a third aspect, there is provided a vehicle comprising a steering system according to any one of the embodiments described above in relation to the second aspect.

According to a third aspect, there is provided a computer program comprising program code means for performing the steps according to any one of embodiments described above in relation to the first aspect when the program code means is run on a computer.

According to a fourth aspect, there is provided a computer readable medium carrying a computer program means for performing the steps according to any one of embodiments described above in relation to the first aspect when the program means is run on a computer.

Effects and features of the third and fourth aspect are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
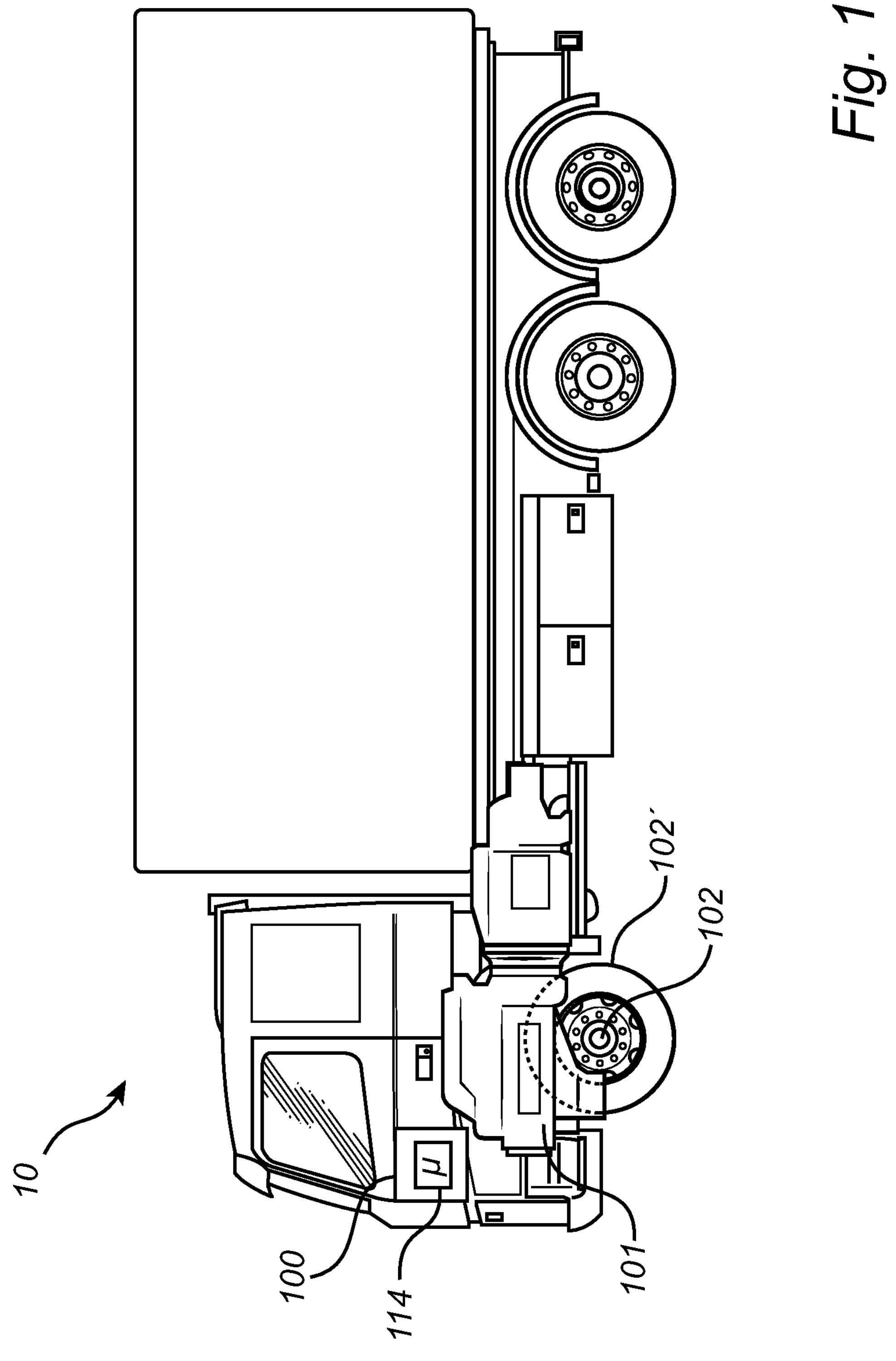
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a pair of steerable wheels 102, 102' for steering the vehicle 10. The vehicle also comprises a traction motor 101 for propelling the wheels of the vehicle. Although the traction motor 101 is illustrated in the form of an internal combustion engine, the vehicle may equally as well be propelled by a traction motor in the form of one or more electric machines. The vehicle 10 also comprises a steering system 100, which is preferably an autonomous steering system 100. The steering system comprises a steering controller 114 for controlling various steering operations for the vehicle 10. The steering controller 114 is thus in the example embodiment of the present disclosure an autonomous steering controller.

The steering controller 114 may include processing circuitry including a microprocessor, microcontroller, programmable digital signal processor or another programmable device. The processing circuitry may also, or instead, each include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry may be at least partly integrated with the steering controller 114.

The steering controller 114 may further form part of an overall vehicle control system implemented on one or more vehicle unit computers (VUC). The VUC may be configured to execute vehicle control methods which are organized according to a layered functional architecture where some functionality may be comprised in a traffic situation management (TSM) domain in a higher layer. The TSM function plans driving operation with a time horizon of, e.g., 10 seconds or so. This time frame corresponds to, e.g., the time it takes for the vehicle to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function which performs force allocation to meet the requests from the TSM in a safe and robust manner.

Figure 2:
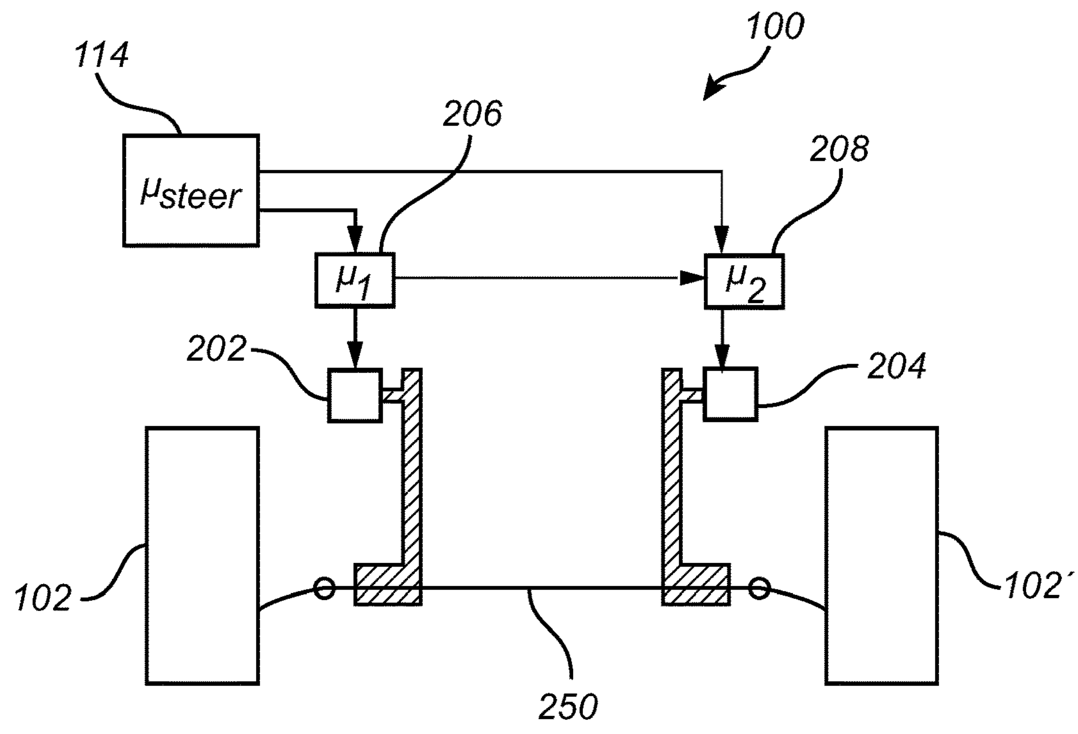
FIG. 2 is a schematic illustration of a steering system according to an example embodiment.

In order to describe the steering system 100 in further detail, reference is made to FIG. 2 which is a schematic illustration of a steering system according to an example embodiment. As can be seen, the steering system 100 comprises the above described steering controller 114. The steering controller 114 is arranged to, amongst other things, determine a steering angle for operating the vehicle 10 during a turning maneuver, i.e. a steering angle required for properly operating the vehicle when turning.

The steering system 100 further comprises a first steering actuator 202 connected to the first steerable wheel 102 of the vehicle, and a second steering actuator 204 connected to the second steerable wheel 102'. The first steering actuator 202 comprises a first steering controller 206 and the second steering actuator 204 comprises a second steering controller 208. The first 206 and second 208 steering controllers are connected to each other for being able to transmit control signals therebetween, which will be described in further detail below. The first steering actuator 202 is thus configured to control the steering operation of the first steerable wheel 102, while the second steering actuator 204 is configured to control the steering operation of the second steerable wheel 102'. As is also illustrated in FIG. 2, the first 102 and second 102' steerable wheels are mechanically connected to each other, here illustrated as being connected to each other using a wheel axle 250.

Figure 3:
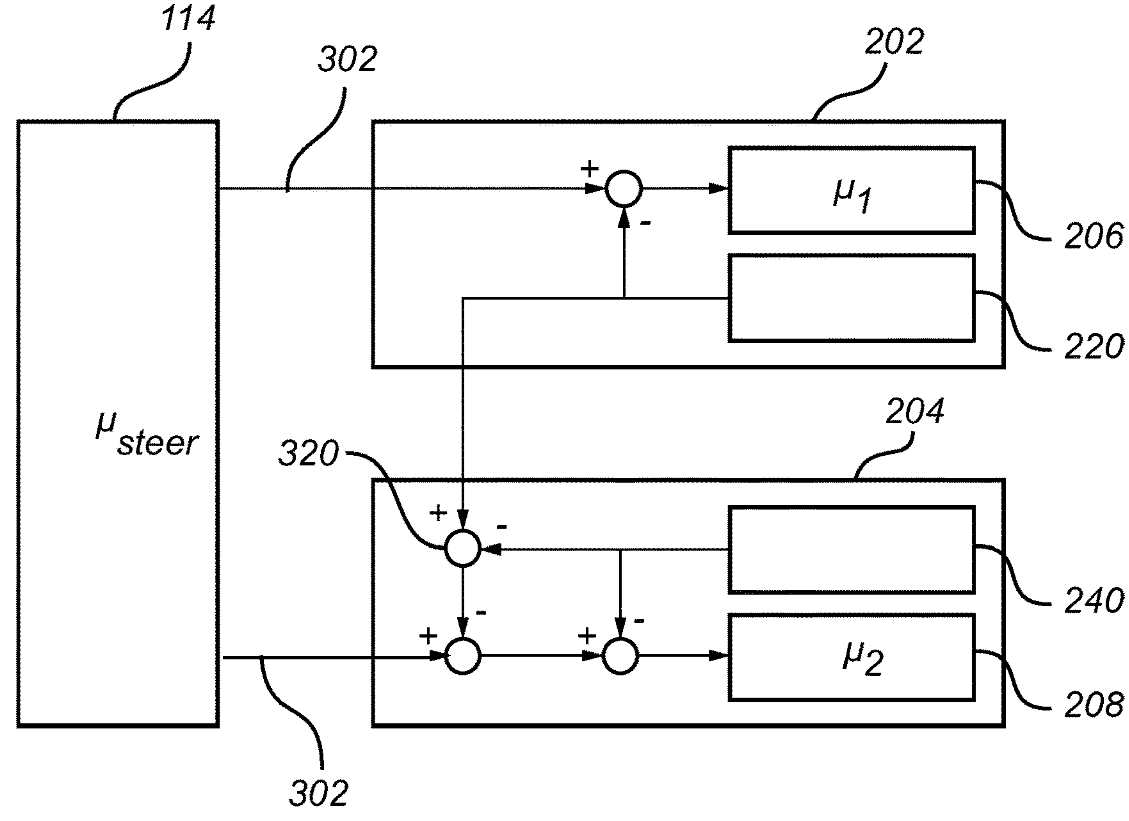
FIG. 3 is a detailed schematic illustration of the steering actuators of the steering system according to an example embodiment.
Figure 4:
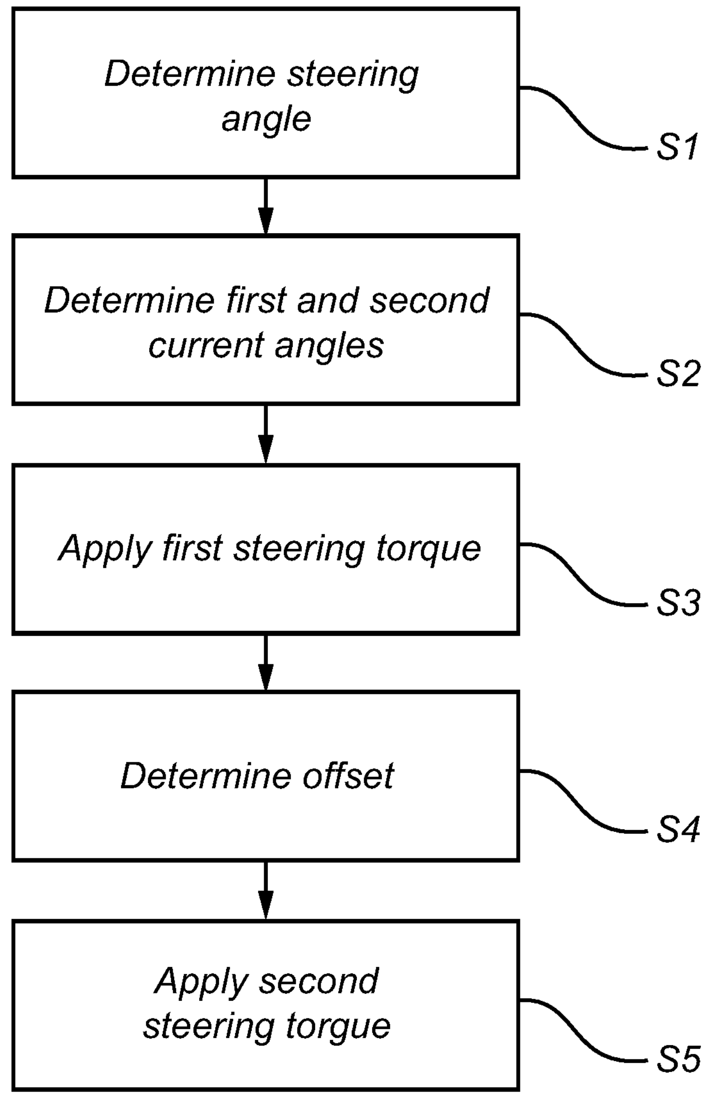
FIG. 4 is a flow chart of a method of controlling steering operation of a vehicle according to an example embodiment.

Reference is now made to FIGS. 3 and 4 in order to describe the operation of the first 202 and second 204 steering actuators in further detail. FIG. 3 is a schematic illustration of the steering actuators of the steering system according to an example embodiment, and FIG. 4 is a flow chart of a method of controlling the steering operation of the steering system 100 according to an example embodiment. In the example embodiment of FIG. 3, the first steering controller 206 is depicted as forming an integral part of the first steering actuator 202, and the second steering controller 208 is depicted as forming an integral part of the second steering actuator 204. As exemplified in FIG. 3, the first steering actuator 202 further comprises a first steering angle sensor 220 and the second steering actuator 204 comprises a second steering angle sensor 240. It should be readily understood that the steering angles can be measured, determined and/or estimated by other means than the use of the first 220 and second 240 steering angle sensors. For example, the steering angles can be determined by measuring an angle of the respective steering actuator 202, 204. The steering angles can, for example, be a mean value of the first and second steering angles, or one of the first and second steering angles. The steering angle can also be an estimation of a relationship between an angle of the steering actuator and the wheel angle, or a measurement of the wheel angle. Thus, a plurality of options is conceivable. However, in order to simplify the reading, the following will describe the first and second steering angles as determined based on a signal from the respective first 220 and second 240 steering angle sensors.

During operation, the steering controller 114 determines S1 a requested steering angle for operating the vehicle 10 during an upcoming, or present, steering maneuver. When the steering controller 114 is an autonomous steering controller, the requested steering angle can be received from e.g. a navigation system or other control system of the vehicle 10. On the other hand, if the vehicle is manually operated vehicle, the steering controller 114 may receive the requested steering angle from a requested steering angle based on a rotation of a steering wheel connected to the steering controller 114. Further, the steering controller 114 transmits the requested steering angle 302 to the first steering controller 206 as well as to the second steering controller 208. Thus, the first 206 and second 208 steering controllers receives the determined requested steering angle 302.

Upon receiving the requested steering angle 302, the first steering controller 206 controls the first steering actuator 202 to generate a steering operation of the first steerable wheel 102. The steering operation of the first steerable wheel 102 is thus based on the requested steering angle 302. When controlling the steering operation of the first steerable wheel 102, the first steering angle sensor 220 detects, i.e. determines S2, a first current, i.e. present, steering angle of the first steerable wheel 102. The actual first current steering angle of the first steerable wheel 102 may not fully correspond to the requested steering angle 302. A difference between the requested steering angle and the first current steering angle is therefore determined by the first steering controller 206. Based on this difference, the first steering controller applies S3 a first steering torque to the first steerable wheel 102 in order to reduce the difference.

In a similar vein, the second steering controller 208 controls the second steering actuator 204 to generate a steering operation of the second steerable wheel 102' upon receiving the requested steering angle 302 from the steering controller 114. The steering operation of the second steerable wheel 102' is thus based on the requested steering angle 302. When controlling the steering operation of the second steerable wheel 102', the second steering angle sensor 240 detects, i.e. determines S2 a second current, i.e. present, steering angle of the second steerable wheel 102'. The actual second current steering angle of the second steerable wheel 102' may not fully correspond to the requested steering angle 302. A difference between the requested steering angle and the second current steering angle is therefore determined by the second steering controller 208.

As described above, the first 206 and second 208 steering controller are connected to each other. An offset steering angle 320 is hereby determined S4, in FIG. 3 illustrated as being determined by the second steering controller 208. The offset steering angle 320 corresponds to a difference between the first current steering angle and the second current steering angle. The second steering controller 208 thereafter applies S5 a steering torque to the second steerable wheel 102'. The second steering torque is based on the offset steering angle 320 as well as the difference between the requested steering angle and the second current steering angle.

Accordingly, the first steering controller 206 share the current steering angle detected by the first steering angle sensor 220 with the second steering controller 208 steering controller. By calculating the offset steering angle 320, the second steering controller will improve its decision making for the second steering actuator 240 to reach the correct requested steering angle.

The steering angle for operating the vehicle during a turning maneuver is continuously updated during the turning maneuver. Hence, the first steering controller 206 continuously share the current steering angle with the second steering controller 208, and the offset steering angle is continuously updated. Also, during operation, the second steering torque is applied independently of the steering torque applied by the first steering actuator. Hence, the first and second steering actuators are individually controlled.

Further, the steering controller 114 may comprise a control unit containing a memory circuit. Hereby, for a turning maneuver operated by the vehicle 10, the memory circuit can store offset steering angles. In an operating condition where, for some reason, it is not possible to determine the first current steering angle, the applied second steering torque can instead be based on the offset steering angle from a most preceding steering operation and a difference between the requested steering angle and the second current steering angle.

Also, the steering controller 114, or one of the first 206 and second 208 steering controllers can be arranged to determine an individual offset steering angle value for a respective steering angle. Hereby, each steering angle is associated with a predictive offset steering angle, which is based on a previous operating condition. Each individual offset steering angle value can be stored in the memory circuit of the steering controller 114, or in the second steering actuator 204.

It is to be understood that the present disclosure is not limited to the embodiments described above and illustrated in the drawings; rather, the skilled person will recognize that many changes and modifications may be made within the scope of the appended claims.

The invention claimed is:

1. A method of controlling a steering operation of a vehicle comprising a first steerable wheel and a second steerable wheel mechanically connected to each other, the method comprising:

determining a requested steering angle for operating the vehicle during a turning maneuver, determining, during the turning maneuver, a first current steering angle indicative of a current steering angle of the first steerable wheel, and a second current steering angle indicative of a current steering angle of the second steerable wheel, applying a first steering torque on the first steerable wheel, the first steering torque being based on a difference between the requested steering angle and the first current steering angle;

determining an offset steering angle, the offset steering angle being a difference between the first current steering angle and the second current steering angle, and applying a second steering torque on the second steerable wheel, the second steering torque being based on the offset steering angle and a difference between the requested steering angle and the second current steering angle.

2. The method according to claim 1, further comprising:

determining, for a first steering actuator controlling a steering operation of the first steerable wheel, a required first steering torque for minimizing the difference between the requested steering angle and the first current steering angle, and controlling the first steering actuator to apply the required first steering torque on the first steerable wheel.

3. The method according to claim 1, further comprising:

determining, for a second steering actuator controlling a steering operation of the second steerable wheel, a required second steering torque based on the offset steering angle and for minimizing the difference between the requested steering angle and the second current steering angle, and controlling the second steering actuator to apply the required second steering torque on the second steerable wheel.

4. The method according to claim 1, wherein the steering angle for operating the vehicle during a turning maneuver is continuously updated during the turning maneuver.

5. The method according to claim 1, wherein the second steering torque is applied independently on the applied first steering torque.

6. The method according to claim 1, further comprising:

storing, by a memory circuit of a control unit, the offset steering angle for each turning maneuver operated by the vehicle, determining that the first current steering angle is unable to be determined, and applying the second steering torque on the second steerable wheel based on an offset steering angle from a most preceding steering operation and a difference between the requested steering angle and the second current steering angle when the first current steering angle is unable to be determined.

7. The method according to claim 1, further comprising:

determining an individual offset steering angle value for a respective one of a plurality of determined steering angles, and storing, by a memory circuit of a control unit, each steering angles and their corresponding individual offset steering angle value.

8. A computer program comprising program code means for performing the steps of claim 1 when the program code means is run on a computer.

9. A non-transitory computer readable medium carrying a computer program for performing the steps of claim 1 when the computer program is run on a computer.

10. A steering system for a vehicle, the steering system comprising:

a first steering actuator connectable to a first steerable wheel of the vehicle, the first steering actuator comprising:

a first steering controller configured to receive a signal indicative of a requested steering angle and to control the first steering actuator to generate a steering operation for the first steerable wheel based on the requested steering angle, a first steering angle sensor configured to determine a first current steering angle indicative of a current steering angle of the first steerable wheel, wherein the first steering controller is configured to determine a difference between the requested steering angle and the first current steering angle, and to control the first steering actuator to apply a first steering torque on the first steerable based on the difference between the requested steering angle and the first current steering angle, and a second steering actuator connectable to a second steerable wheel of the vehicle, the second steerable wheel being mechanically connected to the first steerable wheel, the second steering actuator comprising:

a second steering controller configured to receive the signal indicative of the requested steering angle and to control the second steering actuator to generate a steering operation for the second steerable wheel based on the requested steering angle, a second steering angle sensor configured to determine a second current steering angle indicative of a current steering angle of the second steerable wheel, wherein the second steering controller is configured to determine a difference between the requested steering angle and the second current steering angle, wherein the first steering controller is further configured to transmit the first current steering angle to the second steering controller, wherein the second steering controller is configured to determine an offset steering angle, the offset steering angle being a difference between the first current steering angle and the second current steering angle, wherein the second steering controller is further configured to control the second steering actuator to apply a second steering torque on the second steerable wheel based on the offset steering angle and the difference between the requested steering angle and the second current steering angle.

11. The steering system according to claim 10, wherein the steering system further comprises a steering controller arranged to determine the requested steering angle, and to transmit the requested steering angle to the first steering controller and to the second steering controller.

12. The steering system according to claim 11, wherein the steering controller is an autonomous steering controller.

13. The steering system according to claim 11, wherein the steering controller is connectable to a steering wheel, the steering controller being configured to determine the requested steering angle based on a rotation of the steering wheel.

14. The steering system according to claim 10, wherein the first steering actuator is a primary steering actuator, and the second steering actuator is a secondary steering actuator.

15. A vehicle comprising a steering system according to claim 10.

* * * * *